United States Patent

[11] 3,633,340

| [72] | Inventor | Robert H. Illingworth<br>Madison, N.J. |
| --- | --- | --- |
| [21] | Appl. No. | 6,211 |
| [22] | Filed | Jan. 27, 1970 |
| [45] | Patented | Jan. 11, 1972 |
| [73] | Assignee | The Evening News Publishing Company<br>Newark, N.J. |

[54] PROCESS FOR THE PURIFICATION OF OIL-LADEN AIR
12 Claims, 2 Drawing Figs.

[52] U.S. Cl..................................................... 55/84,
55/90, 55/DIG. 30
[51] Int. Cl......................................................... B01d 47/06
[50] Field of Search............................................. 55/DIG. 30,
DIG. 36, 84, 87, 90, 220, 233; 98/115; 261/17

[56] References Cited
UNITED STATES PATENTS

| 3,324,629 | 6/1967 | Graswich et al. | 55/87 |
| 3,325,973 | 6/1967 | Illingworth | 55/90 |
| 3,403,498 | 10/1968 | Pasha | 55/90 |

*Primary Examiner*—Reuben Friedman
*Assistant Examiner*—Charles N. Hart
*Attorney*—Morgan, Finnegan, Durham & Pine

ABSTRACT: Oil-laden air from machine shops and kitchens and the like is purified by scrubbing with an aqueous solution of a nonionic wetting agent as the air is drawn through a spray chamber. In such a process, entrained oily matter often constituting a health and fire hazard is removed from the air.

INVENTOR
ROBERT H. ILLINGWORTH
BY
Morgan, Finnegan, Durham & Pine
ATTORNEYS

PROCESS FOR THE PURIFICATION OF OIL-LADEN AIR

This invention relates generally to air purification and more particularly to new and useful means and procedures for removing undesirable oily materials entrained in the air.

BACKGROUND OF THE INVENTION

In high-speed machine factories and in rooms where comestibles are prepared, such as kitchens in restaurants, homes, galleys in seagoing vessels, industrial bakeries and the like, large amounts of oily foreign particles are entrained in the air. These oily particles comprise an art-recognized class of water immiscible, generally combustible, ether-soluble, usually liquid or at least easily liquefiable on warming, unctuous substances, which leave a greasy stain on paper or cloth. Merely by way of illustration can be mentioned mineral oils, fuel oils, lubricants derived from petroleum, fatty substances of vegetable and animal organisms, glycerol esters of fatty acids and the like. Unless removed, the oily foreign particle content rapidly builds up to a level which constitutes a serious health hazard to operating personnel and other occupants. It is a matter of common knowledge and experience also that a high oil content in the air also is a very serious fire hazard.

Heretofore, in factories, for example, it has been customary to use a "fast air change" to prevent buildup of oily particles, such as cutting oils, in the air, i.e., fresh air is continuously sucked into the room and foul air continuously exhausted to the atmosphere. This procedure is disadvantageous for several reasons. It requires large blowers and extensive ducting systems. Because of the high content of oil, exhaust of the foul air to the atmosphere creates serious air pollution problems.

It has also been proposed heretofore to remove oily particles, such as cooking fats, from the air in rooms by filtration. A variety of filtration means have been suggested whose purpose is to eliminate the foreign matter from the air. Such filtration means employ filtering elements such as screens, liquid baths, sprays, and the like. Conventional filtering means of the type heretofore employed however require periodic replacements of the filter elements, which become inactive due to clogging by the oily materials.

The present invention has as its principal object to remove the oily particles from environments of the type described.

Another object of this invention is to remove the oily particles from environments of the type described by an improved air spraying operation.

DESCRIPTION OF THE INVENTION

According to this invention, there is provided a method whereby air is purified by scrubbing with an aqueous solution of a nonionic wetting agent.

According to a preferred embodiment of the invention, a method is provided whereby air is purified by being conducted through a spray of the aqueous solution, the method being characterized by the fact that the aqueous spray entrains the foreign particles in a state which is readily collected and separated from the purified air.

The present invention is further characterized by a novel air purifying medium consisting of an aqueous solution of a nonionic wetting agent. The aqueous solution is used to scrub the air to be purified, thereby removing the entrained foreign matter.

In a preferred embodiment, the aqueous solution of nonionic wetting agent is uniformly distributed by spraying into a chamber through which is directed a flow of the air stream to be purified. As the air flows through the chamber, the suspended foreign matter is entrapped by the spray of the solution which continuously wets the air and efficiently scrubs therefrom the entrapped foreign matter. The purified air after scrubbing in the manner described may be recycled to the room or exhausted to the atmosphere.

In another embodiment, the aqueous solution of nonionic wetting agent is uniformly distributed over the surface of a filter element, e.g., a metal screen, which is mounted, e.g., across the spray chamber, in the path of and transversely across to the direction of flow of the air stream to be purified. As the air flows through the filter element, the suspended foreign matter is removed by the spray and also entrapped by the element. The aqueous solution of nonionic wetting agent continuously flows over and continuously wets the filtering element and efficiently scrubs therefrom the entrapped foreign matter, thereby maintaining the filtering surface of the element free of foreign material.

It will be understood that the foregoing general description and the following detailed description as well are exemplary and explanatory of the invention but are not restrictive thereof. Thus, while the air purification means of this invention is particularly adapted to and was designed for use in purifying the air of high-speed machine factories and rooms where comestibles are prepared, the principles underlying the operation of the invention are not limited to such usage, but are generally applicable to air purification systems, including air-conditioning systems. For example, temperature and humidity of the air being treated according to this invention may be regulated by regulating the temperature and rate of flow of the aqueous solution contacting the air to be purified.

Since the invention is particularly directed to eliminating the problems associated with oil normally entrained in the air of high-speed machine factories, reference will be made hereinafter to such use in order to provide an example of a practical and useful embodiment of the invention.

DESCRIPTION OF THE DRAWINGS

The accompanying drawings, referred to herein and constituting part hereof, illustrate two embodiments of the invention, and together with the description, serve to explain the principles of the invention.

With respect to the drawings.

Figure 1:
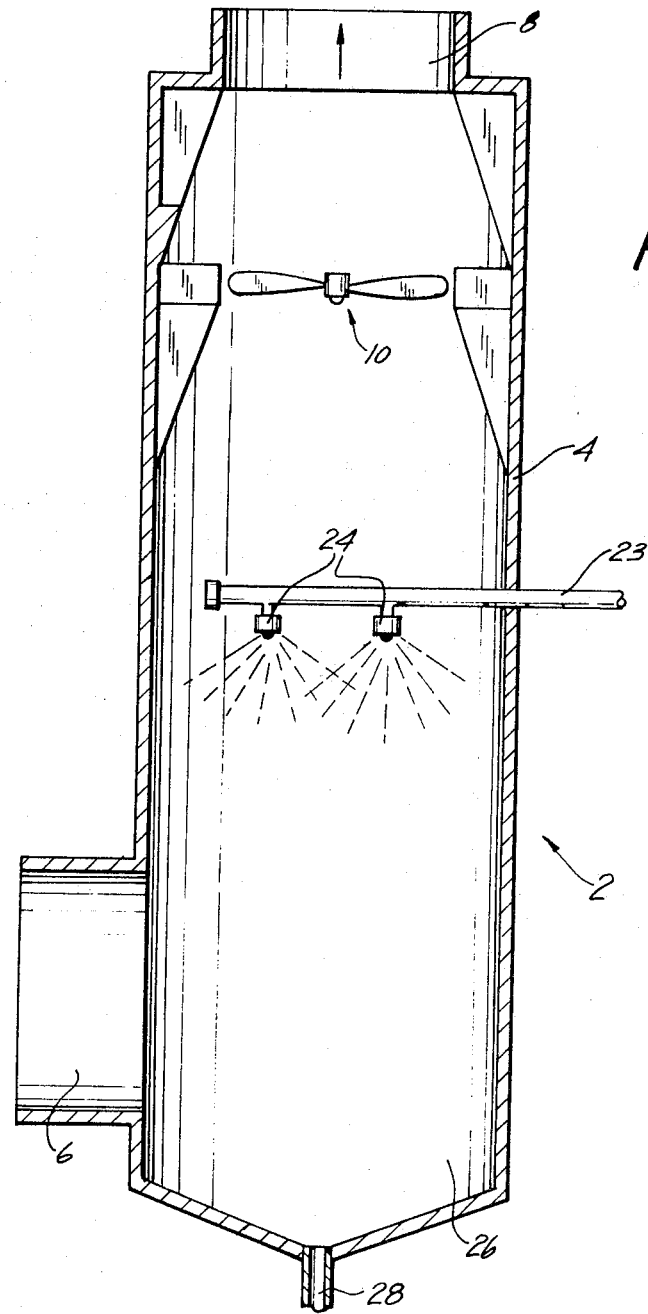
FIG. 1 is a longitudinal sectional and partial elevational view of an air purifying unit embodying the present invention.

The nonionic surface active agent suitable for use in this invention is preferably water soluble.

The most typical representatives of nonionic wetting agents suitable for use herein are the oxyalkylated surfactants or more specifically polyalkylene ethers or polyoxyalkylene surfactants. The methods employed to prepare such oxyalkylated surfactants are well known. Most of these surfactants contain, in at least one place in the molecule and often in several places, an alkanol or a polyglycolether chain. These are most commonly derived by reacting a starting molecule, possessing one or more oxyalkylatable reactive groups, with an alkylene oxide such as ethylene oxide, propylene oxide, butylene oxide, or higher oxides, epichlorohydrin, etc. However, they may be obtained by other methods such as shown in U.S. Pats. No. 2,588,771, and No. 2,596,091–3, or by esterification or amidification with an oxyalkylated material, etc. Mixtures of oxides or successive additions of the same or different oxides may be employed. Any oxyalkylated material may be employed. As typical starting materials may be mentioned alkyl phenols, phenolic resins, alcohols, glycols, amines, organic acids, carbohydrates, mercaptans, and partial esters of polybasic acids. In general, the art teaches that, if the starting material is water soluble, it may be converted into an oil-soluble surfactant by the addition of polypropoxy or polybutoxy chains. If the starting material is oil soluble, it may be converted into a water-soluble surfactant by the addition of polyethoxy chains. Subsequent additions of ethoxy units to the chains tend to increase the water solubility, while subsequent additions of higher alkoxy chains tend to increase the oil solubility. In general, the final solubility and surfactant properties are a result of a balance between the oil-soluble and water-soluble portions of the molecule. Since the solutions of the present invention are water soluble, the oxyalkylated surfactant employed herein should be water soluble also.

The nonionic surfactants preferred for use may be described as water soluble synthetic nonionic surface active agents containing a polyoxyalkylene chain of at least two alkenoxy groups, and derived from alkyl phenolic compounds in which the total number of alkyl carbon atoms is between 4 and 24.

Nonionic surface active agents particularly suitable for carrying out the instant invention may be more specifically represented by the general formula

$$R-(CHR^1-CHR^1-O)_n-H$$

wherein R represents the residue of a suitable alkyl phenol, $R^1$ represents hydrogen or lower alkyl, and $n$ has a value of from 2 to 100 or more and usually from about 4 to 30. It will be appreciated that $n$ corresponds to the number of alkenoxy groups, e.g., ethylene oxide, per molecule of the composition. Compounds of this type are well known in the art. In general, they may be obtained by condensing a polyglycol ether containing the required number of alkenoxy groups or an alkylene oxide such as propylene oxide, butylene oxide, or preferably ethylene oxide, with a suitable alkyl phenol. The amount of alkylene oxide condensed with the alkyl phenol, i.e., the length of the polyoxyalkylene chain, will depend primarily upon the particular compound with which it is condensed. As a convenient rule of thumb, approximately 1 mole of alkylene oxide should be employed for each two carbon atoms in the alkyl phenol. However, the optimum amount of alkylene oxide may readily be determined in any particular case by preliminary test and routine experimentation.

Especially good air purification is achieved when the nonionic surfactant is either an ethylene oxide adduct or dodecyl phenol having a formula corresponding to that indicated above, wherein $n$ is between about 8 and 15, or a condensation product of nonyl-phenol and ethylene oxide having the structural formula

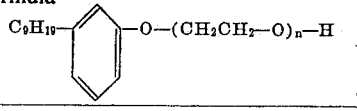

wherein $n$ in an integer between 8 and 15. Such nonionic surfactants constitute highly preferred species for use herein.

A small, effective amount of nonionic wetting agent will be employed in the aqueous solution used to scrub the air and/or to continuously wet the filter element. In general, the aqueous solution will contain less than 1 percent and generally less than 0.5 percent by weight of the nonionic wetting agent. Especially good results are obtained with aqueous solutions containing between about 0.005 and 0.25 percent by weight of nonionic wetting agent, and such solutions are preferred.

Commercially available nonionic wetting agents which may be used in the practice of this invention are described in Schwartz and Perry, Surface Active Agents, Vol. 1, Interscience Publication, New York, pp. 202—213, which reference is incorporated herein by reference.

If desired, a small effective amount of an antifoaming agent may be utilized in the aqueous solution of the nonionic wetting agent. Typical antifoaming agents include the water soluble type, such as glyceride oils and fatty acids; and the water insoluble type, such as octyl alcohols, cyclohexanol, lauryl and cetyl alcohol, 1,2- and 1,3-glycols, water insoluble esters of phosphoric acid, and vegetable oils, such as castor oil, ethyl oleate and the like.

Generally, the water soluble type of antifoaming agent will be used merely as a carrier for the water-insoluble type.

DESCRIPTION OF THE PREFERRED EMBODIMENTS

Referring now more particularly to the drawings, there is illustrated in FIG. 1 an air purification unit 2 comprising a housing 4 formed of sheet metal or other suitable material. Housing 4 may be arranged in a suitable air-ducting system and includes an inlet 6 and an outlet 8. While unit 2 is not limited to any particular size, it has been found that better air circulation is achieved by mounting several smaller units throughout the room to be purified rather than using one large unit.

A fluid supply conduit leads from a separation tank, not shown, more fully described hereinbelow, and has at least one branch 23 which extends into air purification unit 2 through housing 4. Nozzles 24 are mounted on branch pipe 23 near the terminus thereof in a manner whereby a spray of the air-purifying solution may be directed substantially in a pattern to form a spray zone highly saturated with the solution evenly distributed over the chamber from wall to wall. The air passes through the spray zone.

Exhaust fan 10 is mounted within housing 4 on the outlet side of the spray zone, drawing the contaminated air through inlet 6, past the spray, and exhausting the purified air out of housing 4 through outlet 8. There can be optionally provided a heater unit removable mounted within housing 4 for heating the purified air.

Conduit 28 is provided in the lower casing 26 of housing 4 below the spray zone. As herein preferably embodied, there is no spillover of the purifying solution from inlet 6 into the room being purified. The air-purifying solution drains down after being sprayed through the spray zone where it contacts and entrains foreign particles from the air stream drawn through inlet 6 by fan 10. Upon draining down into lower casing 26, the solution and entrained particles therein pass through conduit 28 to a sewer or to a recovery system.

Figure 2:
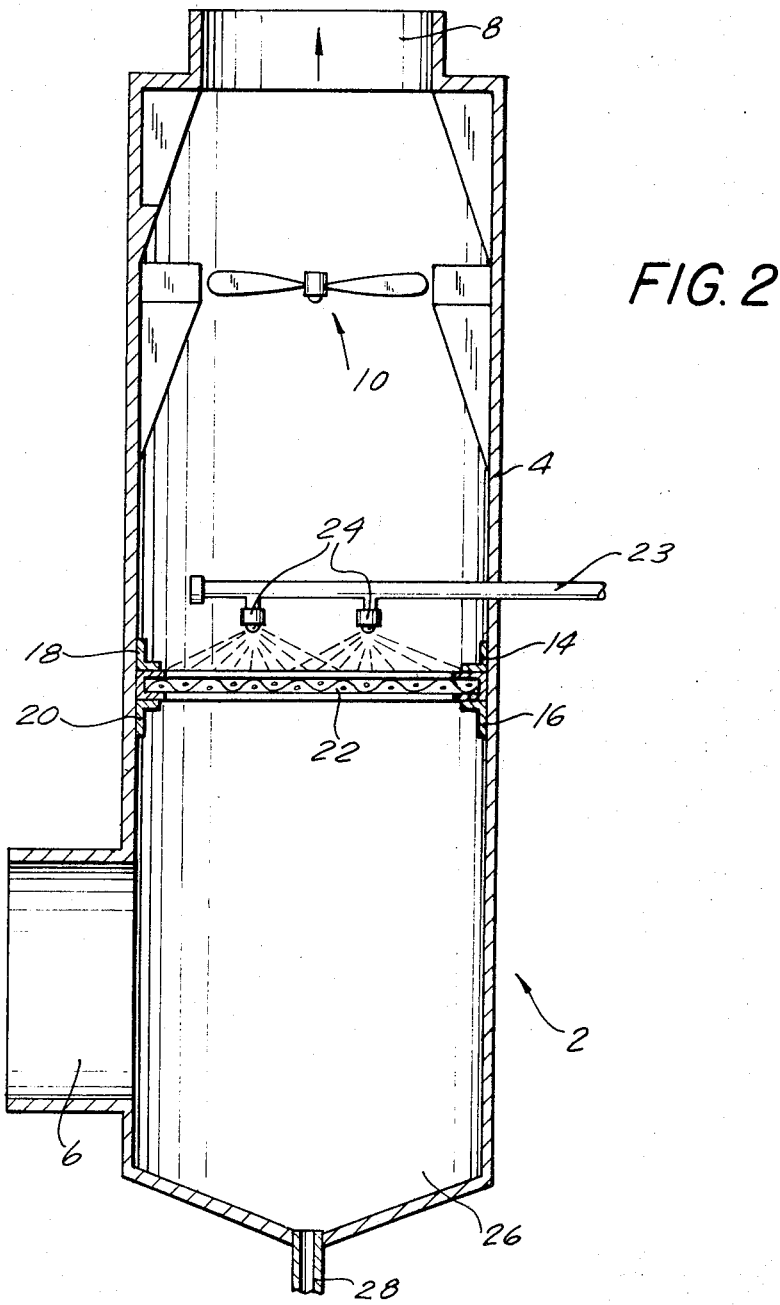
FIG. 2 is a view of an air purifying unit similar to that of FIG. 1, but in which there is placed a filter element.

There is illustrated in FIG. 2 an air purification unit according to this invention which includes a filter element. This unit is somewhat similar to the embodiment illustrated in FIG. 1, but housing 4 has mounted near the inlet thereof, in a horizontal plane, extending from the vertical casings of the housing, a filter element 22 preferably in the form of a metal screen, removably supported by brackets 14, 16 and 18, 20. The filter screen may be formed of stainless steel or other suitable material.

Exhaust fan 10 is mounted within housing 4 on the outlet side of screen 22, drawing the contaminated air through inlet 6, past filter element 22, and exhausting the purified air out of housing 4 through outlet 8.

In the embodiment of FIG. 2, nozzles 24 are mounted on branch pipe 23 near the terminus thereof in a manner whereby a spray of the air-purifying solution may be directed substantially normally to filter element 22, evenly distributing the solution over the surface of the screen. In this embodiment, the air-purifying solution upon being sprayed onto the filter screen, drains down through the screen where it contacts and entrains foreign particles. Upon draining off the screen, the solution and entrained particles pass into the drain through conduit 28 to a sewer or recovery system.

The recovery system, if used, can comprise, for example, a tank to make up the solution and a separation tank of any conventional type together with the usual piping and pumps to circulate the barren solution and the solution pregnant with entrained particles. Parallel piping, the design of which is well within the capabilities of those skilled in the art, can be used in systems utilizing more than one purifying unit, so that only one recovery system can be made to serve all of the units.

In operation, a suitable air-purifying solution according to this invention is made up in a tank or, for example, in the barren solution chamber of a separation tank, whereupon exhaust fan 10 is set into operation and the solution is pumped from the makeup tank through a supply line into feed line 23 to nozzles 24 where it is sprayed into the spray zone continuously contacting and wetting the air stream. Exhaust fan 10 draws oil-laden contaminated air from the high-speed machine room, kitchen or the like, through inlet 6 and into the spray zone where it contacts the purifying solution. As the air passes through the spray zone, the solution scrubs the air, removing the oily foreign particles therefrom. The purified air is then either exhausted to the atmosphere or recycled to the room. The solution carrying the oily particles scrubbed from the air drains into lower chamber 26 and moves through conduit 28 either to a sewer or to a separation tank. In the said tank the oily particles will rise to the top and collect and can then be discharged into a sewer system. The decontaminated solution, which settles, may then be recycled to the filter area. Additional amounts of water and chemical may be added as needed.

An obvious embodiment is to include a heater unit in chamber 4. Since the air is cooled upon contacting the aqueous purifying solution, if it is desired to recycle the purified air to the room, it may be necessary to heat the air in a cold climate. Of course, in a warm climate, the purified air could be additionally cooled by passing cold water, rather than steam, through coils of a heater.

The invention in its broader aspects is not limited to the methods and compositions described but departures may be made therefrom within the scope of the accompanying claims without departing from the principles of the invention and without sacrificing its chief advantages.

I claim:

1. The method for removing oily foreign particles selected from the group consisting of mineral oils, fuel oils, lubricants derived from petroleum, fatty substances of vegetable and animal organisms and glycerol esters of fatty acids from air which comprises directing said air through a spray chamber and continuously wetting said air with a spray of an aqueous solution consisting essentially of water and a small effective amount, but less than about 1.0 percent by weight, of a water-soluble nonionic wetting agent corresponding to the formula $$R\text{—}(CHR^1\text{—}CHR^1\text{—}O)_n\text{—}H$$

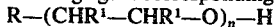

wherein R represents the residue of an alkyl phenol in which the total number of carbon atoms is between 7 and 24, $R^1$ represents hydrogen or lower alkyl, and $n$ is an integer of from 2 to 100.

2. The process of claim 1 wherein said air is from a high-speed machine factory or a room in which comestibles are prepared and said aqueous solution contains about 0.005 to about 0.25 percent by weight of said wetting agent.

3. The process of claim 2 wherein said foreign particles comprise oil produced in high-speed machining operations.

4. A method for removing oily foreign particles selected from the group consisting of mineral oils, fuel oils, lubricants derived from petroleum, fatty substances of vegetable and animal organisms and glycerol esters of fatty acids from air which comprises directing said air through a spray chamber, continuously wetting said air with a spray of an aqueous solution consisting essentially of water and a small effective amount but less than 1.0 percent by weight of a water-soluble nonionic wetting agent, said wetting agent having the structural formula

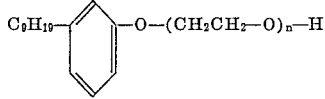

wherein $n$ is an integer between 8 and 15, and separating from said air said aqueous solution containing said foreign particles.

5. The process of claim 4 wherein said air is from a high-speed machine factory or a room in which said air is from a high-speed machine factory or a room in which comestibles are prepared and said aqueous solution contains about 0.005 to about 0.25 percent by weight of said wetting agent.

6. The process of claim 5 wherein said foreign particles comprise oil produced in high-speed machining operations.

7. A method for removing oily foreign particles selected from the group consisting of mineral oils, fuel oils, lubricants derived from petroleum, fatty substances of vegetable and animal organisms and glycerol esters of fatty acids from air which comprises directing said air through a spray chamber and continuously wetting said air with an aqueous solution consisting essentially of water and a small effective amount of about 0.005 to about 1 percent by weight of a water-soluble nonionic wetting agent corresponding to the formula $R\text{—}(CHR^1\text{—}CHR^1\text{—}O)_n\text{—}H$ wherein R represents the residue of an alkyl phenol in which the total number of carbon atoms is between 7 and 24, $R^1$ is a member selected from the group consisting of hydrogen and lower alkyl, and $n$ an integer of from 4 to 30, which wetting agent removes said foreign particles from said air.

8. The process of claim 7 wherein said air is from a high-speed machine factory or a room in which comestibles are prepared and said aqueous solution contains between about 0.005 and about 0.25 percent by weight of said wetting agent.

9. A method for removing oily foreign particles selected from the group consisting of mineral oils, fuel oils, lubricants derived from petroleum, fatty substances of vegetable and animal organisms and glycerol esters of fatty acids from air which comprises directing said air through a spray chamber and continuously wetting said air with an aqueous solution consisting essentially of water and effective amount of between 0.005 and about 1.0 percent by weight of a water-soluble nonionic wetting agent, said wetting agent consisting essentially of an ethylene oxide adduct of dodecyl phenol having between about 8 and 15 ethylene oxide groups per molecule.

10. The process of claim 9 wherein said air is from a high-speed machine factory or a room in which comestibles are prepared and said aqueous solution contains about 0.005 to about 0.25 percent by weight of said wetting agent.

11. The process of claim 10 wherein said oily foreign particles comprise oil produced in high-speed machining operations.

12. A method as defined in claim 1 including the steps of directing said air through a filter element, entrapping said particles in said element, continuously wetting said air and said filter element with a spray of said aqueous solution, the continuous wetting removing said entrapped foreign particles from said filter element and separating from said air said aqueous solution containing said foreign particles.

* * * * *

PO-1050 (5/69)

UNITED STATES PATENT OFFICE
CERTIFICATE OF CORRECTION

Patent No. 3,633,340      Dated January 11, 1972

Inventor(s) Robert H. Illingworth

It is certified that error appears in the above-identified patent and that said Letters Patent are hereby corrected as shown below:

Column 6, lines 1 and 2, delete "or a room in which said air is from a high-speed machine factory"; and Column 6, line 32 before "effective" insert -- small --.

Signed and sealed this 11th day of July 1972.

(SEAL)
Attest:

EDWARD M. FLETCHER, JR.
Attesting Officer

ROBERT GOTTSCHALK
Commissioner of Patents